United States Patent
Kamata

(10) Patent No.: US 9,160,225 B2
(45) Date of Patent: Oct. 13, 2015

(54) HIGH VOLTAGE INVERTER DEVICE

(75) Inventor: Hisahiro Kamata, Iwanuma (JP)

(73) Assignee: RICOH COMPANY, LTD., Tokyo (JP)

( * ) Notice: Subject to any disclaimer, the term of this patent is extended or adjusted under 35 U.S.C. 154(b) by 891 days.

(21) Appl. No.: 13/412,798

(22) Filed: Mar. 6, 2012

(65) Prior Publication Data

US 2012/0236614 A1     Sep. 20, 2012

(30) Foreign Application Priority Data

Mar. 14, 2011   (JP) .................................. 2011-055778

(51) Int. Cl.
*H02M 1/32*     (2007.01)
*H02M 7/537*   (2006.01)

(52) U.S. Cl.
CPC ................ *H02M 1/32* (2013.01); *H02M 7/537* (2013.01); *Y02B 70/1441* (2013.01)

(58) Field of Classification Search
CPC .............. H02M 1/32; H02M 2001/32; H02M 2001/322; H02M 2001/325; H02M 7/537; H02H 9/005; H02H 9/02; H02H 9/04; H02H 11/00; H02H 11/006; H02H 11/007; H01F 27/343; H01T 4/08
USPC ............ 361/56, 88, 90, 91.1–91.6, 93.7, 118; 363/55, 56.01, 95, 97, 131
See application file for complete search history.

(56) References Cited

U.S. PATENT DOCUMENTS

| | | | |
|---|---|---|---|
| 4,236,187 A | 11/1980 | Mochizuki et al. | |
| 5,617,012 A | 4/1997 | Murakami | |
| 5,917,716 A | 6/1999 | Cho | |
| 8,125,801 B2 | 2/2012 | Park et al. | |
| 2009/0256533 A1* | 10/2009 | Wu et al. | 323/224 |

FOREIGN PATENT DOCUMENTS

| | | |
|---|---|---|
| DE | 37 32 334 A1 | 4/1989 |
| DE | 43 10 513 C1 | 6/1994 |
| JP | 64-016260 * | 1/1989 |

(Continued)

OTHER PUBLICATIONS

"Using the MAX8515 Shunt Regulator in Output Overvoltage Sensing Applications for DC-DC Converters," Application Note 2160, Maxim Integrated Products, Sep. 12, 2003.*

(Continued)

*Primary Examiner* — Adolf Berhane
*Assistant Examiner* — Jye-June Lee
(74) *Attorney, Agent, or Firm* — Westerman, Hattori, Daniels & Adrian, LLP

(57) ABSTRACT

A high voltage inverter device uses, as an input voltage (Vin), a DC voltage or a voltage composed of a DC component with a pulsating current superposed thereon, switches the input voltage by a switching element (Qsw) to apply an exciting current to an excitation winding (NP) of a resonant transformer (10) and output an alternating-current high voltage (Vout) from an output winding (NS) of the resonant transformer. An abnormal voltage detection circuit (7) including a varistor (12) detects an abnormal voltage generated in the excitation winding (NP) of the resonant transformer (10), and when the abnormal voltage is detected, its signal is transmitted by a photocoupler (11) to a control circuit (20), thereby causing the control circuit (20) to stop its oscillation operation to stop a switching operation of the switching element (Qsw).

6 Claims, 7 Drawing Sheets

(56) References Cited

FOREIGN PATENT DOCUMENTS

| | | | |
|---|---|---|---|
| JP | 64-016260 A | | 1/1989 |
| JP | 04-351422 | * | 12/1992 |
| JP | 05-199650 A | | 8/1993 |
| JP | 05-260537 A | | 10/1993 |
| JP | 07-163044 A | | 6/1995 |
| JP | 08-066021 A | | 3/1996 |
| JP | 09-019052 A | | 1/1997 |
| JP | 10-109383 | * | 4/1998 |
| JP | 10-109838 A | | 4/1998 |
| JP | 2000-05063 | * | 2/2000 |
| JP | 2000-050632 A | | 2/2000 |
| JP | 2004-135489 A | | 4/2004 |
| JP | 2005-251480 A | | 9/2005 |

OTHER PUBLICATIONS

Hirschmann, Walter, "Switching power supplies: concepts, components, applications", 1990, pp. 48-49, 324-325, 404-405; cited in German Search Report issued Sep. 14, 2012.

"Surge Protector", Wikipedia, The Free Encyclopedia. Retrieved Jun. 8, 2009; cited in German Search Report issued Sep. 14, 2012.

German Search Report of German Patent Application No. DE102012203963.5, issued Sep. 14, 2012; with partial translation.

Japanese Notification of Reason(s) for Refusal dated Jan. 21, 2014, issued in corresponding Japanese application No. 2011-055778 (4 pages). Translation available to the USPTO through the Dossier Access System.

* cited by examiner

HIGH VOLTAGE INVERTER DEVICE

BACKGROUND OF THE INVENTION

1. Field of the Invention

The invention relates to a high voltage inverter device such as a switching regulator, an inverter or the like used in a high voltage power supply unit, a power supply unit for discharge or the like.

2. Description of the Related Art

A high voltage inverter device using, as an input voltage, a DC voltage or a voltage composed of a DC component with a pulsating current superposed thereon, switching the input voltage to apply an exciting current to an excitation winding on a primary side of a transformer and output a high voltage from an output winding on a secondary side thereof is in heavily used as a high voltage power supply unit.

For example, atmospheric pressure plasma is applied to various industrial products as a means for surface treatment for improvement of surface quality, removal of contamination or the like. In the case where adhesion, printing, coating or the like is applied to a resin or the like, performing pre-treatment using the atmospheric pressure plasma can improve the wettability thereof.

In order to generate the atmospheric pressure plasma, a high voltage is required, and the high voltage needs to be safely obtained by an inverter device.

In an alternating-current inverter device generating a high voltage of several KV or more than 10 KV to 20 KV easily generating the atmospheric pressure plasma, the high voltage within the voltage range can cause electric shock, or ignition, smoking or the like due to spark and is extremely dangerous to a human body.

On the other hand, in the safety standard of International Standards IEC60950 (J60950), the input voltage is safe when it is within 60 VDC or its voltage peak value does not exceed 42.4V that is SELV (Safety Extra Low Voltage). Therefore, it is essential to form a configuration that a voltage within SELV is used as the input voltage of the inverter device and a supply power is limited on the input side even if components of the inverter circuit have insulation breakdown for any cause.

Hence, it is required to instantaneously detect the effect of a load in the high voltage inverter device. When overload, insulation deterioration, short-circuit, earth fault, abnormal discharge or the like occurs in a load to which a high voltage is supplied or its power feeding circuit or the like, it is urgent to limit or cut off the power on the input side. If such a state is left as it is, the transformer experiences dielectric breakdown, thereby possibly delivering an electric shock or posing a risk more than that to a human body.

A back electromotive force due to inductance of the transformer increases according to current. Therefore, when the output of the inverter device suddenly becomes no load, a no-load voltage is abnormally generated at power-on of the inverter device, and the abnormal voltage causes breakage of insulation of an insulator or leakage, thereby breaking a component such as a transformer.

Conventionally, in the inverter device with an output power of several mW to several W, the dielectric breakdown and so on of the transformer can be prevented only by inserting a fuse into its input power supply circuit and limiting power.

Further, there is a technique as described, for example, in JP H5-199650A as a conventional abnormality detection device of a high voltage power supply unit. This technique detects a secondary output voltage of a high voltage transformer directly or after dividing the voltage, compares its detection value to a predetermined abnormality determination reference value, judges that an abnormality occurs when the detection value continuously becomes the reference value or lower for a predetermined period or longer, and cuts off the input into the high voltage transformer.

However, in the case that the high voltage power supply unit to be protected is a high voltage inverter device whose output voltage is an alternating-current high voltage exceeding 10 KV, even if it is tried to detect the secondary output voltage directly or after dividing the voltage, there is no resistor standing the high voltage between the output terminals. Even if a plurality of resistors are connected in series for use, the number of the resistors required is several tens or more.

Further, the voltage easily leaks to cause the circuit to malfunction or breakdown. Therefore, the secondary output voltage cannot be easily detected, and it is not easy to provide a protection circuit depending on its detection value.

SUMMARY OF THE INVENTION

The invention has been made to solve the above problems, and its object is to make it possible to immediately detect an abnormal voltage when it is generated on the output side and surely perform a protection operation even in a high voltage inverter device whose output voltage is an alternating-current high voltage exceeding 10 KV.

In the invention, a high voltage inverter device using, as an input voltage, a DC voltage or a voltage composed of a DC component with a pulsating current superposed thereon, switching the input voltage by a switching element to apply an exciting current to an excitation winding of a resonant transformer and output an alternating-current high voltage from an output winding of the resonant transformer, is configured as follows in order to achieve the above object.

Specifically, an abnormal voltage detection circuit detecting an abnormal voltage generated in the excitation winding of the resonant transformer, and a control circuit controlling a switching operation of the switching element to stop the switching operation of the switching element by a signal that the abnormal voltage detection circuit has detected the abnormal voltage, are provided.

It is also adoptable that, in place of the abnormal voltage detection circuit, an abnormal voltage detection circuit detecting an abnormal voltage generated between terminals of the switching element during a period when the switching element is OFF is provided, and a control circuit stops the switching operation of the switching element by a signal that the abnormal voltage detection circuit has detected the abnormal voltage.

The abnormal voltage detection circuit can detect the abnormal voltage, for example, by a varistor.

It is preferable that the signal that the abnormal voltage detection circuit has detected the abnormal voltage is transmitted to the control circuit by a photocoupler or a phototriac-coupler, and a light-emitting element thereof is provided on the abnormal voltage detection circuit side and a light-receiving element thereof is provided on the control circuit side.

The abnormal voltage detection circuit can be composed of a series circuit in which a diode, a varistor, and the light-emitting element of the photocoupler or the phototriac-coupler are connected in series.

A parallel circuit composed of a resistor for current limitation and a capacitor may be inserted in the series circuit.

It is preferable that the resonant transformer is composed of a plurality of individual resonant transformers having same characteristics, excitation windings of the plurality of resonant transformers are connected in parallel or in series and simultaneously excited, output windings of the plurality of resonant transformers are connected in parallel or in series with each other. Further, it is desirable that time axes of output voltage waveforms of the output windings are in synchronization.

Further, in the high voltage inverter device according to the invention, an arrester connected in parallel with the output winding of the resonant transformer, and an exciting current detection circuit detecting the exciting current flowing through the excitation winding of the resonant transformer, may be provided in place of the abnormal voltage detection circuit. In this case, a control circuit controlling a switching operation of the switching element stops the switching operation of the switching element when a value of the exciting current detected by the exciting current detection circuit exceeds a predetermined value.

The exciting current detection circuit can be composed of a resistor connected in series with the excitation winding and the switching element.

It is desirable that when the resonant transformer is composed of a plurality of individual resonant transformers having same characteristics, the output windings of the plurality of resonant transformers are connected in series, and an arrester is individually connected in parallel with each of the output windings.

According to a high voltage inverter device of the invention, any of the above configurations makes it possible to immediately detect an abnormality when it occurs on the output side and stop the operation of the control circuit, thereby surely performing a protection operation even in a high voltage inverter device whose output voltage is an alternating-current high voltage exceeding 10 KV.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, embodiments to carry out the invention will be concretely described based on the drawings.

First Embodiment

Figure 1:
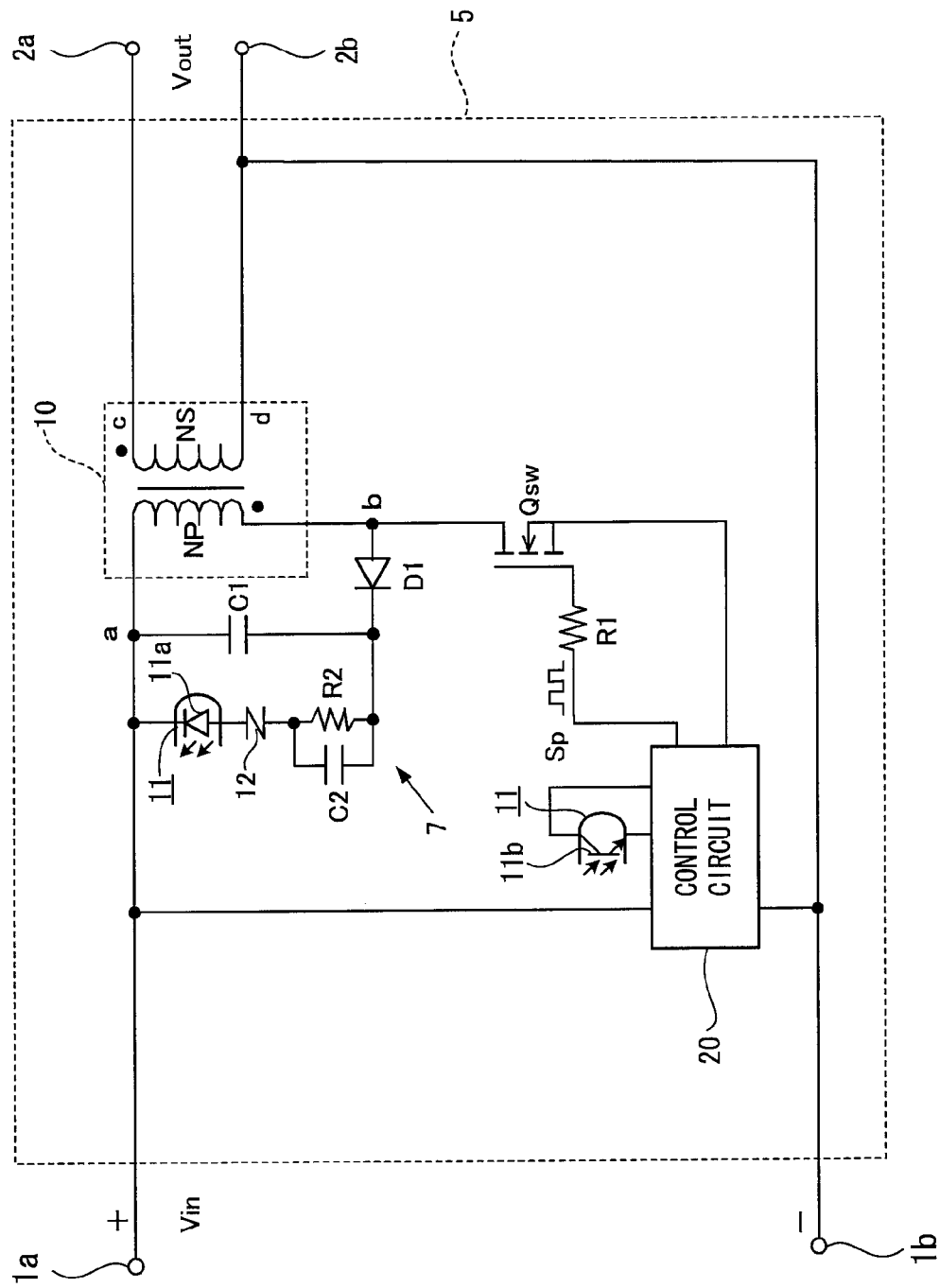
FIG. 1 is a circuit diagram illustrating a first embodiment of a high voltage inverter device according to the invention.

FIG. 1 is a circuit diagram illustrating a first embodiment of a high voltage inverter device according to the invention.

The high voltage inverter device 5 includes input terminals 1a, 1b, a resonant transformer 10, output terminals 2a, 2b, and a control circuit 20 and a switching element Qsw which control the resonant transformer 10 and so on.

The high voltage inverter device 5 switches an input voltage Vin that is a DC voltage or a voltage composed of a DC component with a pulsating current superposed thereon, which is supplied from the input terminals 1a, 1b, by a switching element Qsw to apply an exciting current to an excitation winding NP on the primary side of the resonant transformer 10. And the resonant transformer 10 outputs an alternating-current high voltage of over ten KV from an output winding NS on the secondary side so as to output an output voltage Vout being the high voltage from the output terminals 2a, 2b to a not-illustrated load. It is preferable that the input voltage Vin is a voltage within Safety Extra Low Voltage (SELV).

The excitation winding NP of the resonant transformer 10 has one end connected to the input terminal 1a on the positive electrode side and the other end connected to the input terminal 1b on the negative electrode side through between the drain and the source of the switching element Qsw composed of an FET and through the control circuit 20. The output winding NS of the resonant transformer 10 has one end c connected to the output terminal 2a and the other end d connected to the output terminal 2b.

The input terminal 1b on the negative electrode side is also connected to the output terminal 2b and to a not-illustrated frame ground. It is desirable to earth (ground) the frame ground for safety. Further, a power supply voltage is supplied from the input terminals 1a, 1b also to the control circuit 20.

The control circuit 20 includes an oscillation circuit and is formed as an Integrated Circuit (IC). The control circuit 20 operates by the input voltage Vin supplied from the input terminals 1a, 1b and applies a switching pulse Sp to the gate of the switching element Qsw via a resistor R1 to turn ON/OFF the switching element Qsw. Thereby, current is intermittently applied to the excitation winding NP of the resonant transformer 10 to generate an alternating-current high voltage of over ten KV in the output winding NS.

It was found that the following theoretical expressions are established, in the high voltage inverter device using the resonant transformer, among the input voltage: Vin, the sharpness of resonance: Qe, the drain-source voltage of the switching element Qsw: Vds, the output voltage: Vout, the turns ratio (the number of turns of the output winding/the number of turns of the excitation winding): Nps.

$$Vds = Vout/Nps \qquad (1)$$

$$Vout = Qe \cdot Vin \qquad (2)$$

Accordingly, the output voltage Vout is proportional to the sharpness of resonance Qe from Expression (2), so that a sufficient boost ratio can be achieved by making Qe large even if the turns ratio is not made so large.

Here, the sharpness of resonance Qe will be described. Taking up the characteristics of the resonant current to the frequency, the resonant current reaches a maxim value at the resonant frequency fo, and assuming that a width of the frequency when the resonant current becomes $1/\sqrt{2}$ of the maxim value (referred to as a half width) at frequencies around the resonant frequency fo is $\Delta f$, the sharpness of resonance is a dimensionless number expressed by $Qe = fo/\Delta f$.

Between an a point on the positive electrode side of the input power supply and a b point on the positive electrode side of the switching element Qsw (between both terminals of the excitation winding NP of the resonant transformer 10) in FIG. 1, a capacitor C1 having one end connected to the a point is connected in series with a diode D1 having the anode connected to the b point to constitute a snubber circuit. The snubber circuit is provided for resetting the resonant transformer 10 and for suppressing the voltage of the switching element Qsw.

Further, as an abnormality detection circuit for performing a protection operation that is a characteristic of the invention, a series circuit composed of a resistor R2, a varistor 12, and a light-emitting diode (LED) 11a being a light-emitting element of a photocoupler 11 is connected in parallel with the capacitor C1. The connection order of the elements constituting the series circuit is arbitrary as long as it is in the direction in which current flows to the LED 11a via the diode D1.

The resistor R2 is a resistor for limiting the current flowing through the LED 11a. In this embodiment, a capacitor C2 is connected in parallel with the resistor R2 so that only the alternating current bypasses the resistor R2 by the capacitor C2 so as to instantaneously flow.

These elements constitute an abnormality detection circuit 7 which detects an abnormality on the load side.

On the other hand, a phototransistor 11b being a light-receiving element of the photocoupler 11 is connected to the control circuit 20. The LED 11a being a light-emitting element and the phototransistor 11b being a light-receiving element are separately illustrated in FIG. 1, but actually arranged to face each other in the same container to constitute one photocoupler 11. The photocoupler 11 is a noncontact relay in which the input and the output are completely insulated from each other.

The varistor 12 is a nonlinear resistor element having such a property that its electric resistance is high when the voltage between both terminals is low, but the electric resistance rapidly decreases when the voltage between both terminals rises above a certain level.

In the high voltage inverter device 5 of this embodiment, the output voltage Vout of the resonant transformer 10 is not directly detected but the voltage across the excitation winding NP is detected.

The voltage generated between the terminals of the excitation winding NP (Vnp) during the OFF period of the switching element Qsw at the occurrence of abnormality such as a no-load state is a negative voltage which is substantially inversely proportional to the turns ratio (the number of turns of output winding NS/the number of turns of excitation winding NP) of the resonant transformer 10 with respect to the voltage generated across the output winding. Therefore, the voltage can be easily detected by the abnormality detection circuit 7.

Figure 2:
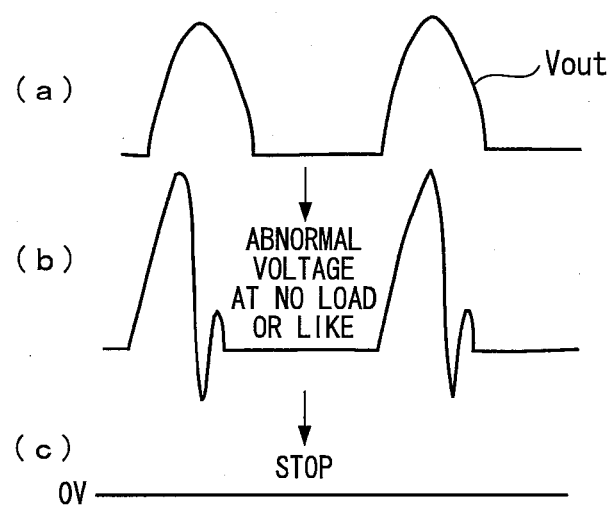
FIG. 2 is a chart of the voltage waveform between output terminals for explaining the operation of the embodiment illustrated in FIG. 1.

The protection operation according to this embodiment will be described also referring to FIG. 2. FIG. 2 is a waveform chart of the voltage between the output terminals 2a and 2b for explaining the operation of the embodiment illustrated in FIG. 1.

At the time when the high voltage inverter device 5 illustrated in FIG. 1 is normally operating with a load connected between the output terminals 2a and 2b, a voltage of the waveform illustrated at (a) of FIG. 2 is generated in the output winding NS of the resonant transformer 10. More specifically, a nearly sinusoidal half-wave alternating-current high voltage with a peak value of over ten KV is generated during the OFF period in the switching cycle of the switching element Qsw, and the alternating-current high voltage is the output voltage Vout.

In this event, a nearly sinusoidal half-wave negative voltage Vnp of a waveform made by inverting the waveform of the output voltage Vout with a peak value of a fraction of the turns ratio Nps of the resonant transformer 10 (Vnp=Vout/Nps) is generated between the terminals of the excitation winding NP.

In this state, the voltage applied to the varistor 12 of the abnormality detection circuit 7 connected between both terminals (between contact points a and b) of the excitation winding NP of the resonant transformer 10 in FIG. 1 is a predetermined value or less. Since the varistor 12 has a high resistance value, little current flows through the series circuit composed of the diode D1, the resistor R2, the varistor 12, and the LED 11a of the photocoupler 11 constituting the abnormality detection circuit 7.

Accordingly, the LED 11a does not emit light, and no light is incident on the phototransistor 11b of the photocoupler 11 and the phototransistor 11b is in an OFF state. Therefore, the control circuit 20 performs an oscillation operation and outputs a switching pulse Sp to cause the switching element Qsw to turn ON/OFF. In short, the high voltage inverter device 5 is normally operating.

If the output side suddenly becomes no load, the output voltage is no longer fixed by a load. Therefore, for example, an abnormal high voltage of a waveform as illustrated at (b) of FIG. 2 and with a peak value as high as 20 KV is generated on the output winding NS side of the resonant transformer 10, and an abnormal negative voltage of a waveform made by inverting that waveform and with a peak value of 1/Nps is correspondingly generated also on the excitation winding NP side.

Since the voltage is applied to the varistor 12 via the diode D1 and so on of the abnormality detection circuit 7 in FIG. 1, the voltage applied to the varistor 12 exceeds a predetermined value and the resistance value of the varistor 12 rapidly decreases. This causes current to suddenly start to flow through the series circuit, the current flows through the LED 11a of the photocoupler 11, and the LED 11a emits light. This corresponds to an abnormality detection signal. The abnormal voltage instantaneously flows through the capacitor C1 of the snubber circuit, and then immediately flows through the abnormality detection circuit 7 including the varistor 12.

The phototransistor 11b receives the light by the light emission of the LED 11a in the photocoupler 11 and turns ON, which is a signal to stop the operation of the control circuit 20. The signal causes the control circuit 20 to stop its oscillation, the control circuit 20 no longer outputs the switching pulse Sp, and the switching element Qsw is kept OFF.

In other words, the high voltage inverter device 5 stops its operation, and the output voltage Vout becomes 0V and does not change any longer as illustrated at (c) of FIG. 2.

Note that since the capacitor C2 is connected in parallel with the resistor R2 for current limitation of the abnormality detection circuit 7, the alternating-current component of the abnormal voltage is immediately applied to the varistor 12 via the capacitor C2, thus causing no delay in the detection timing due to the voltage drop by the resistor R2.

In this manner, when an abnormal voltage is generated as in the case of sudden no-load, the abnormality detection circuit 7 can immediately detect the generation of the abnormal voltage and perform the protection operation to stop the operation of the high voltage inverter device 5. Accordingly, it is possible to surely prevent insulation breakdown of the resonant transformer 10 due to the abnormal high voltage. In addition, the abnormality detection circuit is simple in configuration and therefore can be implemented at low cost, and is free from the possibility of leakage of voltage and malfunction because the detection signal is transmitted in a completely insulated state.

The reason to use the varistor for detection of the abnormal voltage in the voltage Vnp on the excitation winding NP side will be described here. There is Zener diode as a semiconductor element which becomes a conduction state when the applied voltage exceeds a predetermined value (Zener voltage). However, since the Zener diode is low in Zener voltage, many Zener diodes need to be connected in series for use in the detection circuit for the high voltage. Then, the mounting arrangement becomes long and the inductance thereof increases to fail to protect the voltage which is to be protected. Further, the amount of current which can be applied to the Zener diode is small at the order of milliampere (mA).

For this reason, a varistor is used which is relatively high in voltage at which the resistance value rapidly decreases, and to which a larger amount of current can be applied.

Second Embodiment

Figure 3:
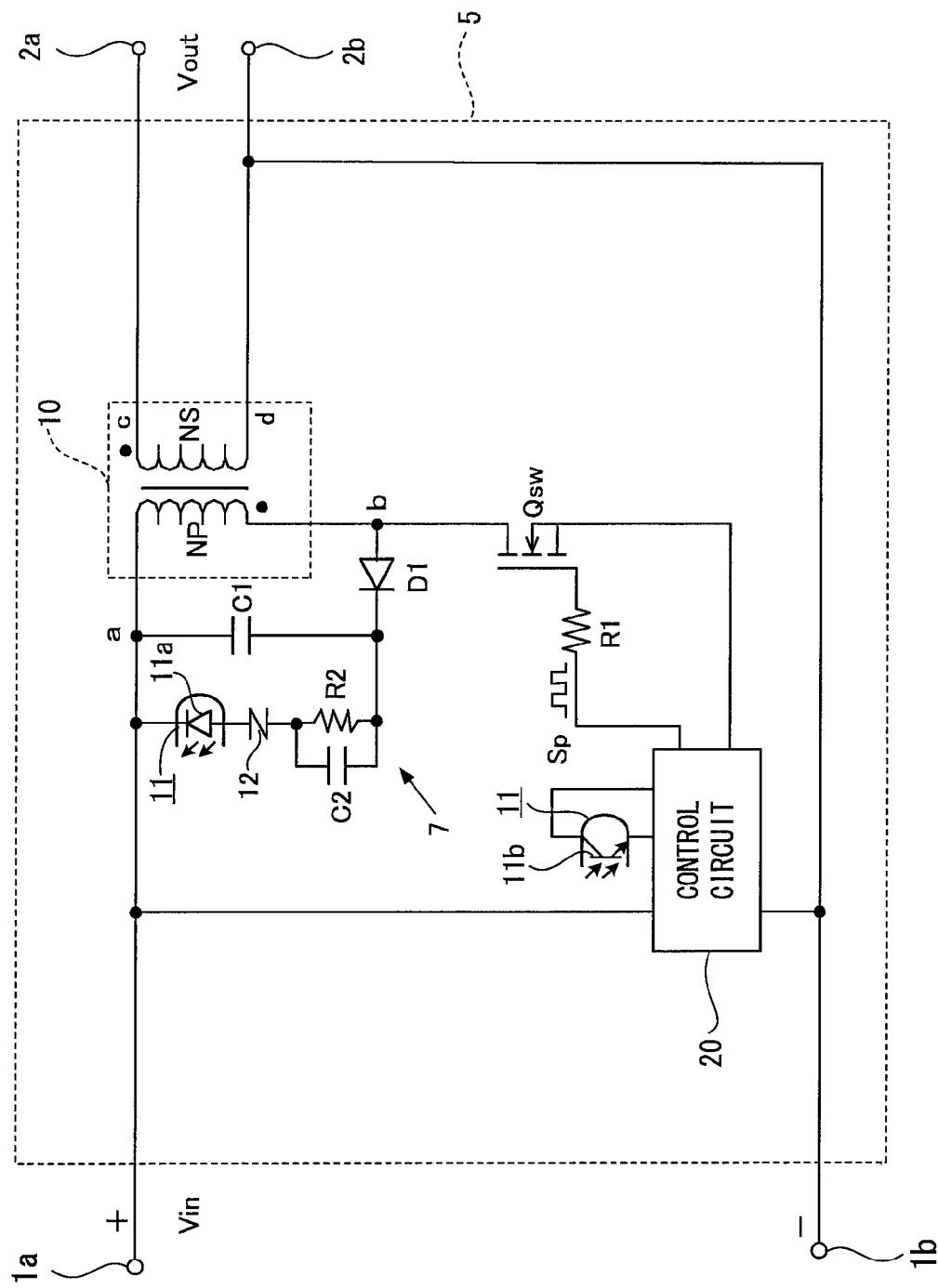
FIG. 3 is a circuit diagram illustrating a second embodiment of the high voltage inverter device according to the invention.

FIG. 3 is a circuit diagram illustrating a second embodiment of the high voltage inverter device according to the invention.

Figure 4:
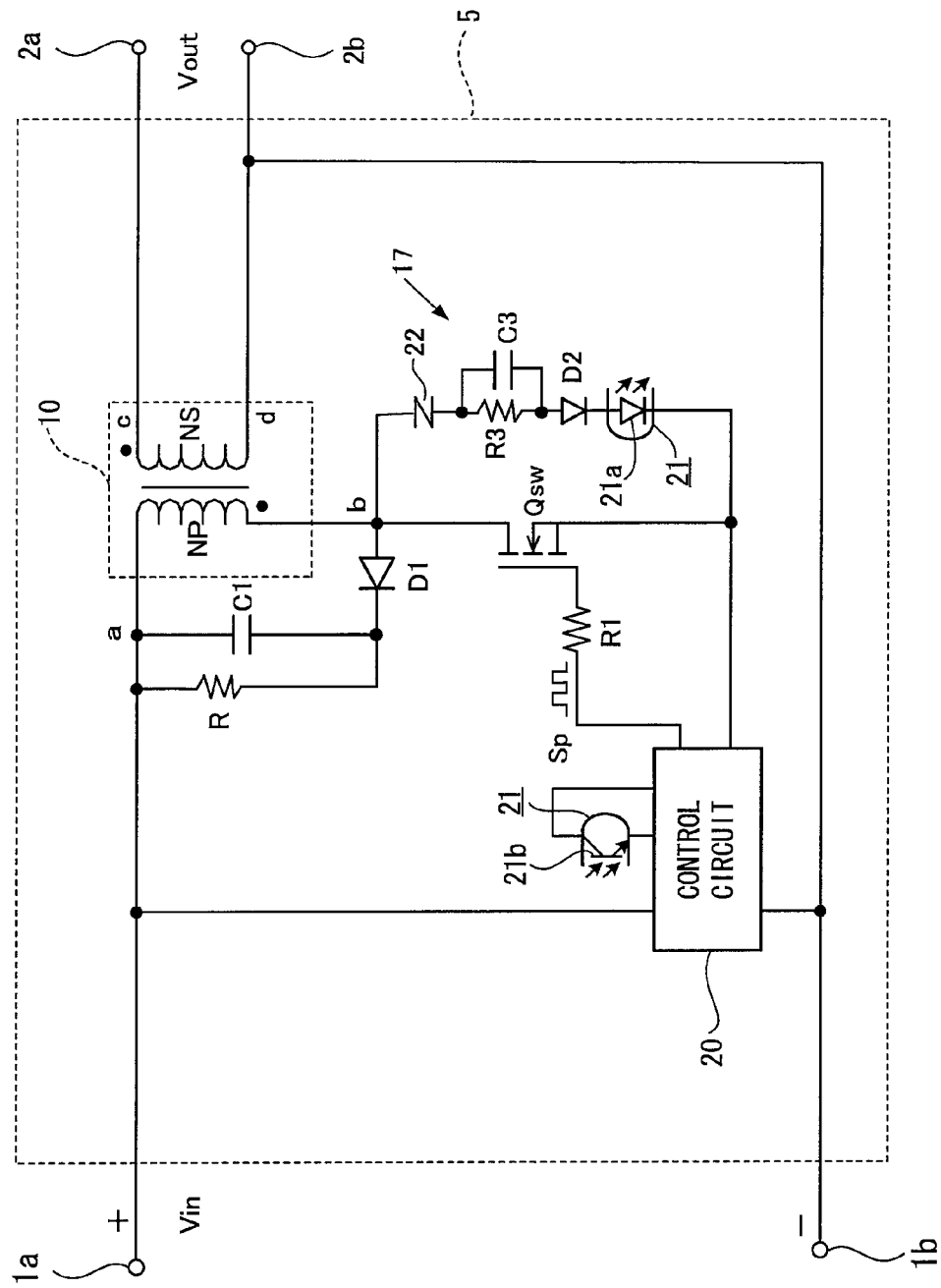
FIG. 4 is a circuit diagram illustrating a third embodiment of the high voltage inverter device according to the invention.
Figure 5:
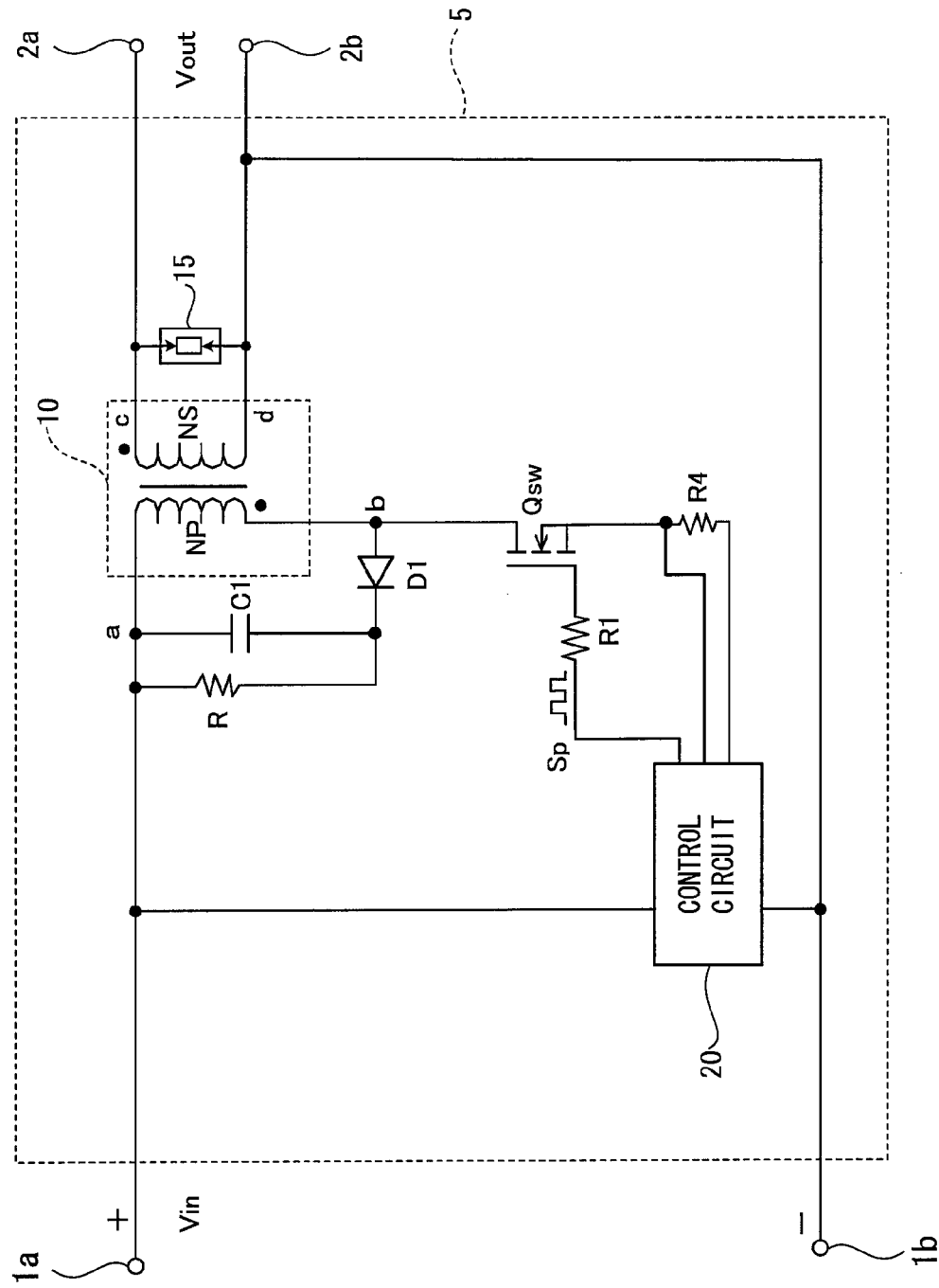
FIG. 5 is a circuit diagram illustrating a fourth embodiment of the high voltage inverter device according to the invention.

In FIG. 3 and subsequent FIG. 4 to FIG. 7, the same numerals or letters are given to portions corresponding to those in FIG. 1 and description thereof will be omitted. Further, a high voltage inverter device 5 illustrated in FIG. 3 to FIG. 5 is different in the configuration of the protection circuit from but equal in the basic configuration and function as a high voltage inverter to the high voltage inverter device 5 illustrated in FIG. 1, and therefore the same numerals or letters are used for convenience.

The second embodiment illustrated in FIG. 3 is almost the same as the first embodiment described using FIG. 1. The different point is only that a phototriac-coupler 13 is used, in place of the photocoupler 11 of the abnormality detection circuit 7, as a detection signal transmitting means of an abnormality detection circuit 7'.

The phototriac-coupler 13 is a noncontact relay in which a light-emitting diode (LED) 13a being a light-emitting element and a phototriac 13b being a light-receiving element are arranged to face each other in the same container and the input and the output are completely insulated from each other. When current flows through the LED 13a and the LED 13a emits light, the phototriac 13b receives the light and conducts in both directions into a completely conducting state, so that a larger amount of current than that applied to the phototransistor 11b can be applied to the phototriac 13b.

The LED 13a of the phototriac-coupler 13 is connected in series with a varistor 12 of the abnormality detection circuit 7', and the phototriac 13b is connected to a control circuit 20.

The abnormality detection operation by the abnormality detection circuit 7' and the function of transmitting a detection signal thereof to the control circuit 20 via the phototriac-coupler 13 to stop the oscillation operation of the control circuit 20 are the same as those of the first embodiment.

Third Embodiment

FIG. 4 is a circuit diagram illustrating a third embodiment of the high voltage inverter device according to the invention.

In a high voltage inverter device 5 in the third embodiment, an abnormality detection circuit 17 is connected in parallel with a switching element Qsw composed of an FET between the drain and the source of the switching element Qsw. The abnormality detection circuit 17 is configured such that a varistor 22, a resistor R3, a diode D2, and an LED 21a being a light-emitting element of a photocoupler 21 are connected in series, and a capacitor C3 is connected in parallel with the resistor R3.

The connection order of the elements constituting the series circuit of the abnormality detection circuit 17 is arbitrary as long as it is in the direction in which the voltage generated between the drain and the source of the switching element Qsw causes current to flow through the LED 21a via the diode D2.

Further, a phototransistor 21b being a light-receiving element of the photocoupler 21 is connected to a control circuit 20. Further, a resistor R is connected in parallel with a capacitor C1 of a snubber circuit.

In the third embodiment, a voltage Vds between the drain and the source of the switching element Qsw is detected instead of directly detecting the output voltage.

The voltage Vds is generated during the OFF period in the switching cycle of the switching element Qsw, and Vds=Vout/Nps as expressed in the above-described Expression (1). The voltage (peak value) becomes a fraction of the turns ratio of a resonant transformer 10 with respect to the output voltage Vout being the alternating-current high voltage as illustrated at (a) of FIG. 2 and therefore can be easily detected by the abnormality detection circuit 17.

The abnormality detection circuit 17 operates as in the first embodiment except that the voltage Vds applied thereto is a positive voltage, and if the output side suddenly becomes no load, the voltage Vds becomes abnormally large. Thus, the voltage applied to the varistor 22 of the abnormality detection circuit 17 exceeds a predetermined value and the resistance value of the varistor 22 rapidly decreases to cause current to suddenly start to flow through the series circuit, and the current flows through the LED 21a of the photocoupler 21 and the LED 21a emits light.

The phototransistor 21b of the photocoupler 21 receives the light and turns ON to stop the oscillation operation of the control circuit 20. Thus, the control circuit 20 no longer outputs the switching pulse Sp, and the switching element Qsw is kept OFF. Accordingly, the high voltage inverter device 5 stops its operation.

The roles of the resistor R3 and the capacitor C3 are the same as those of the resistor R2 and the capacitor C2 in FIG. 1. Further, in place of the photocoupler 21, a phototriac-coupler may be used as in the second embodiment illustrated in FIG. 3.

Further, in place of the resistor R of the snubber circuit, the abnormality detection circuit 7 of the first embodiment or the abnormality detection circuit 7' of the second embodiment may also be provided, and the phototransistor 11b of the photocoupler 11 or the phototriac 13b of the phototriac-coupler 13 may also be connected to the control circuit 20. In this case, an OR of a conduction signal of the phototransistor 11b or the phototriac 13b and a conduction signal of the phototransistor 21b of the photocoupler 21 may be taken so that either conduction signal stops the oscillation operation of the control circuit 20.

Fourth Embodiment

FIG. 5 is a circuit diagram illustrating a fourth embodiment of the high voltage inverter device according to the invention.

In a high voltage inverter device 5 in the fourth embodiment, an arrester 15 is connected in parallel with an output winding NS of a resonant transformer 10 (between output lines from both ends of the output winding NS to output terminals 2a, 2b).

Further, as an exciting current detection circuit detecting an exciting current flowing through an excitation winding NP of the resonant transformer 10, a resistor R4 for current detection is inserted in a line connecting the source of a switching element Qsw to a frame ground via a control circuit 20, and the voltage between both ends of the resistor R4 is inputted into the control circuit 20 as an exciting current detection signal.

More specifically, the resistor R4 is connected in series with the excitation winding NP and the switching element Qsw, and the exciting current flowing through the excitation winding NP of the resonant transformer 10 flows through the resistor R4 during the time when the switching element Qsw is ON. Accordingly, the magnitude of the exciting current is converted by the resistor R4 into a voltage, which can be inputted into the control circuit 20.

According to this embodiment, in the case that the output side suddenly becomes no load, when a high voltage with an abnormal high peak value is generated in the output winding NS of the resonant transformer 10 as descried above, the arrester immediately discharges to drop the voltage, thereby increasing the exciting current flowing through the excitation winding NP. The increased exciting current is detected by the resistor R4 and inputted into the control circuit 20.

When an inter-terminal voltage of the resistor R4 (proportional to the magnitude of the exciting current), namely, the value of the exciting current exceeds a predetermined value, the control circuit 20 stops its oscillation operation and no longer outputs a switching pulse Sp, and the switching element Qsw is kept OFF. Accordingly, the high voltage inverter device 5 stops its operation.

As described above, not only by suppressing the abnormal output voltage on the secondary side of the resonant transformer 10 but also by stopping the operation of the high voltage inverter device 5, the abnormal overvoltage applied to the load of the high voltage inverter device 5 is surely suppressed. When a breakdown current flows through the arrester 15, the voltage between the electrodes of the arrester 15 once drops to about 10 V, and if the control circuit 20 continues to oscillate, the resonant transformer 10 abnormally generates heat or the circuit components break down with stress applied thereto.

In this embodiment, when the breakdown current flows through the arrester 15, the control circuit 20 stops its oscillation operation to surely stop the operation of the high voltage inverter device 5 until the abnormal state is eliminated. Further, also when there is an abnormality again at restoration of power, the control circuit 20 stops its operation.

According to this embodiment, also when insulation deterioration, short-circuit, earth fault or the like occurs on the load side, overcurrent flows through the load circuit to cause the voltage across the output winding of the resonant transformer 10 to rapidly drop, thereby also increasing the exciting current flowing through the excitation winding NP. The increased exciting current is detected through use of the inter-terminal voltage of the resistor R4, and the control circuit 20 stops its oscillation operation. Therefore, it is possible to avoid such a situation that the load, the power feeding circuit, or the output winding of the transformer burns out or ignites.

Fifth Embodiment

Figure 6:
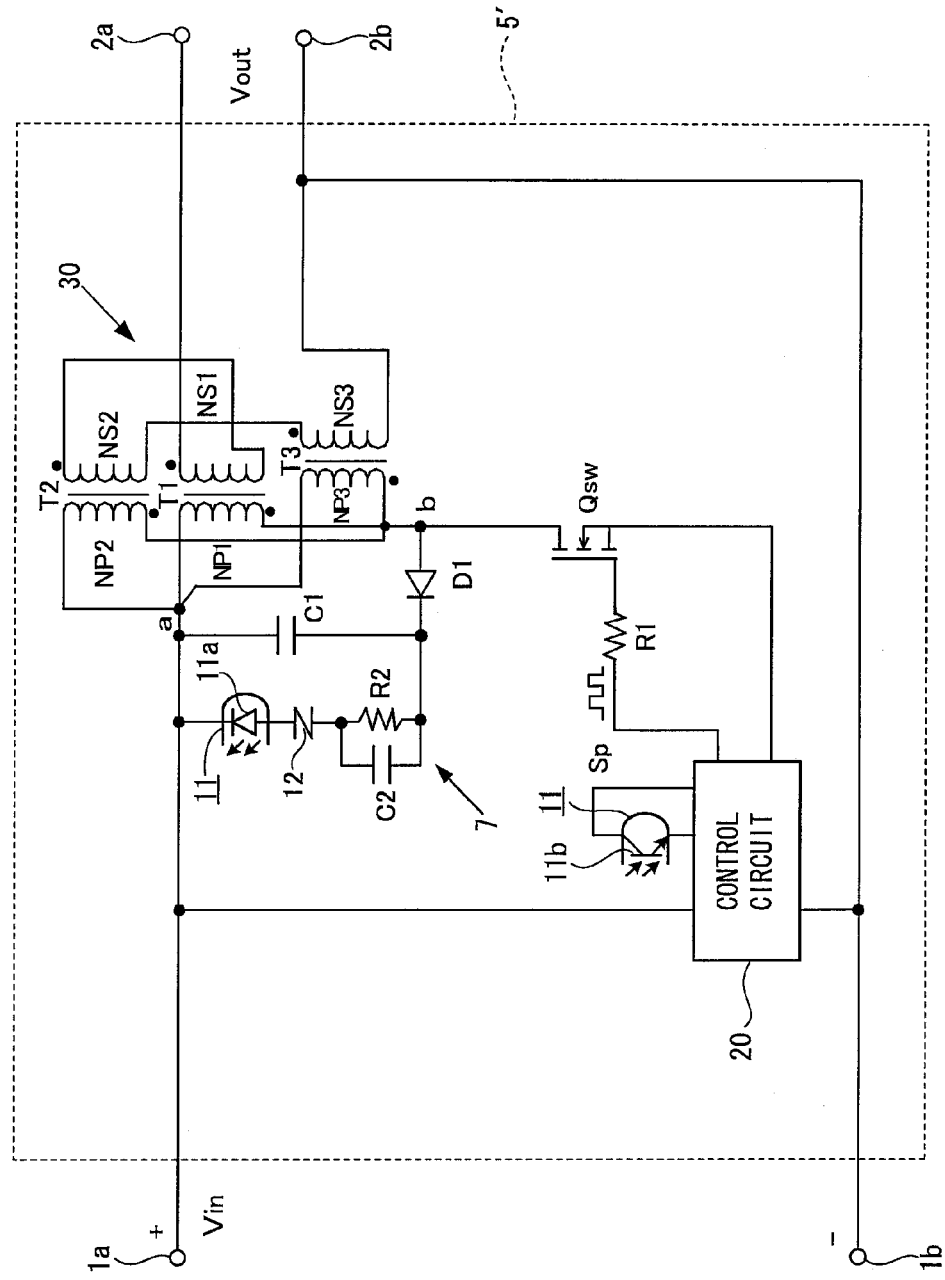
FIG. 6 is a circuit diagram illustrating a fifth embodiment of the high voltage inverter device according to the invention.

FIG. 6 is a circuit diagram illustrating a fifth embodiment of the high voltage inverter device according to the invention.

In a high voltage inverter device 5' in the fifth embodiment, a transformer 30 generating a high voltage is composed of three resonant transformers T1, T2, T3 having the same configuration and the same characteristics.

Further, excitation windings NP1, NP2, NP3 of the three resonant transformers T1, T2, T3 are connected in parallel between an a point on the positive electrode side of an input power supply and a b point on the positive electrode side of a switching element Qsw. All output windings NS1, NS2, NS3 of the resonant transformers T1, T2, T3 are connected in series such that terminals of the output windings NS1, NS3 which are not connected to each other are connected to output terminals 2a, 2b respectively.

The high voltage inverter device 5' in this embodiment simultaneously excites the excitation windings NP1, NP2, NP3 of the three resonant transformers T1, T2, T3 constituting the transformer 30 each of which has separate and independent core with completely different magnetic path and has the same characteristic, to synchronize the time axes of the output voltage waveforms of the output windings NS1, NS2, NS3 on the output side, and adds or multiplies the respective output voltages.

Therefore, a higher voltage output and a larger output power can be supplied stably and safely.

In this case, it is preferable to arrange the switching element Qsw so that the wiring distances between the drain terminal of the switching element Qsw and the negative electrode side terminals of the excitation windings NP1, NP2, NP3 are equal.

Further, in this embodiment, between the contact points a and b between which the excitation windings NP1, NP2, NP3 of the three resonant transformers T1, T2, T3 are connected in parallel, a diode D1 and a capacitor C1 of a snubber circuit are connected as in the first embodiment illustrated in FIG. 1, and a series circuit composed of a resistor R2, a varistor 12, and an LED 11a being a light-emitting element of a photocoupler 11 constituting an abnormality detection circuit 7 is connected in parallel with the capacitor C1, and a capacitor C2 is connected in parallel with the resistor R2. Further, a phototransistor 11b being a light-receiving element of the photocoupler 11 is connected to a control circuit 20.

Also in this embodiment, when an abnormal high voltage is generated on the output side of the transformer 30, the varistor 12 of the abnormality detection circuit 7 immediately detects the generation of the abnormal high voltage, and a detection signal thereof is transmitted by the photocoupler 11 to the control circuit 20 to stop the oscillation operation of the control circuit 20. This operation is the same as in the first embodiment.

However, in the case of this embodiment, the voltage generated in the excitation winding of each of the resonant transformers T1, T2, T3 (the voltage between contact points a and b) becomes smaller in inverse proportion to the product of the turns ratio of the resonant transformer and the number of transformers with respect to the output voltage.

Note that in place of the photocoupler 11, a phototriaccoupler may be used as in the second embodiment illustrated in FIG. 3.

Further, in place of the abnormality detection circuit 7, an abnormality detection circuit 17 may be connected in parallel with the switching element Qsw between the drain and the source of the switching element Qsw, and a phototransistor 21b of a photocoupler 21 thereof may be connected to the control circuit 20 as in the third embodiment illustrated in FIG. 4.

Alternatively, both the abnormality detection circuit 7 and the abnormality detection circuit 17 may be provided, their phototransistor 11b of the photocoupler 11 and phototransistor 21b of the photocoupler 21 may be connected to the control circuit 20, and an OR of conduction signals of the phototransistors 11b and 21b may be taken so that either conduction signal stops the oscillation operation of the control circuit 20.

Note that all of the excitation windings NP1, NP2, NP3 of the three resonant transformers T1, T2, T3 having the same configuration and the same characteristics constituting the transformer 30 may be connected in series. Further, all of the output windings NS1, NS2, NS3 thereof may be connected in parallel. Further, the number of resonant transformers in use may be two or four or more. However, the preferable number of resonant transformers in practice seems to be up to about four because the arrangement and pattern become larger with the number to cause problems in EMI such as unrequired radiation.

Sixth Embodiment

Figure 7:
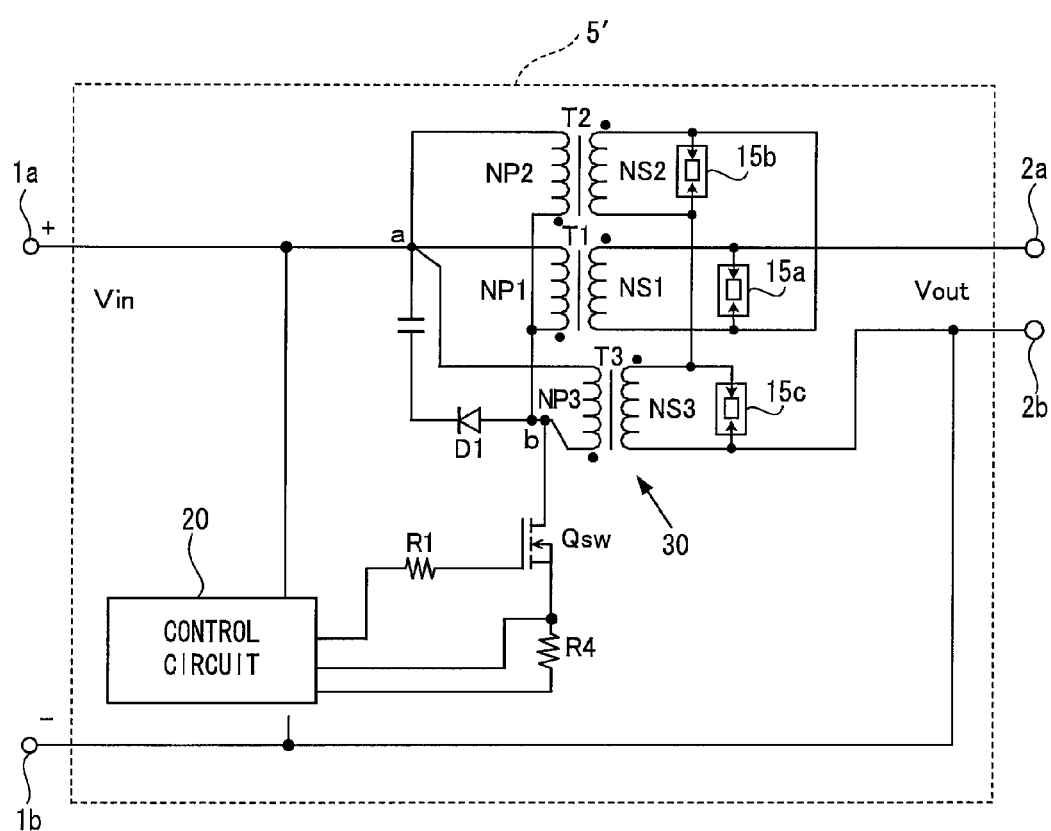
FIG. 7 is a circuit diagram illustrating a sixth embodiment of the high voltage inverter device according to the invention.

FIG. 7 is a circuit diagram illustrating a sixth embodiment of the high voltage inverter device according to the invention.

The high voltage inverter device 5' in the sixth embodiment includes a transformer 30 having the same configuration as that in the above-described fifth embodiment, and arresters 15a, 15b, 15c are individually connected in parallel with respective output windings N1, N2, N3 connected in series of three resonant transformers T1, T2, T3 thereof.

Further, a resistor R4 for current detection is inserted in a line connecting the source of a switching element Qsw to a frame ground via a control circuit 20, and the voltage between both ends of the resistor R4 is inputted into the control circuit 20. The resistor R4 detects values of exciting currents flowing through the excitation windings NP1, NP2, NP3 connected in parallel of the three resonant transformers T1, T2, T3.

According to this embodiment, when an abnormal high voltage is generated in any one of the output windings NS1, NS2, NS3 of the resonant transformers T1, T2, T3 constituting the transformer 30, the arrester (any one of 15a, 15b, 15c) connected thereto immediately discharges and a breakdown current flows to drop the voltage, thereby increasing the exciting current flowing through the excitation winding (any one of NP1, NP2, NP3) of the resonant transformer. The increased exciting current is detected by the resistor R4 and inputted into the control circuit 20.

When the inter-terminal voltage of the resistor R4 (proportional to the magnitude of the exciting current) becomes a predetermined value or more, the control circuit 20 stops its oscillation operation and no longer outputs a switching pulse Sp, and the switching element Qsw is kept OFF. Accordingly, the high voltage inverter device stops its operation.

The configuration of the transformer 30 can be variously changed similarly to those described in the above-described fifth embodiment.

In place of the arresters 15a, 15b, 15c, one arrester may be connected between output terminals 2b and 2b between which output windings NS1, NS2, NS3 of the three resonant transformers T1, T2, T3 are connected in series.

As described above, according to any embodiment, it is possible to instantaneously detect the generation of an abnormal high voltage due to the effect of a load and stop the inverter operation to thereby avoid the insulation breakdown of the transformer and the risk to a human body.

Further, the best modes are described in the embodiments, but all of the configurations are not always necessary and can be arbitrarily omitted. Furthermore, the elements described in the embodiments can be arbitrarily changed and elements other than those elements can be added as a matter of course.

Moreover, the abnormality detection circuits and so on in the embodiments can be used in appropriate combination within a consistent range.

The invention can be used for various high voltage generating devices such as a switching regulator, an inverter, a high voltage power supply, a power supply for discharge and so on.

What is claimed is:

1. A high voltage inverter device switching an input voltage by a switching element to apply an exciting current to an excitation winding of a resonant transformer and output an alternating-current high voltage from an output winding of the resonant transformer, said high voltage inverter device comprising:

an abnormal voltage detection circuit detecting an abnormal voltage generated in the excitation winding of the resonant transformer; and a control circuit controlling a switching operation of the switching element and stopping the switching operation of the switching element by a signal that said abnormal voltage detection circuit has detected the abnormal voltage, wherein the signal that said abnormal voltage detection circuit has detected the abnormal voltage is transmitted to said control circuit by a photocoupler or a phototriac-coupler, and a light-emitting element thereof is provided on said abnormal voltage detection circuit side and a light-receiving element thereof is provided on said control circuit side, and wherein said abnormal voltage detection circuit is composed of a series circuit in which a diode, a varistor, and the light-emitting element of the photocoupler or the phototriac-coupler are connected in series.

2. The high voltage inverter device according to claim 1, wherein a parallel circuit composed of a resistor for current limitation and a capacitor is inserted in the series circuit.

3. The high voltage inverter device according to claim 1, wherein the resonant transformer is composed of a plurality of individual resonant transformers having same characteristics, excitation windings of the plurality of individual resonant transformers are connected in parallel or in series and simultaneously excited, output windings of the plurality of individual resonant transformers are connected in parallel or in series with each other, and time axes of output voltage waveforms of the output windings are in synchronization.

4. A high voltage inverter device switching an input voltage by a switching element to apply an exciting current to an excitation winding of a resonant transformer and output an alternating-current high voltage from an output winding of the resonant transformer, said high voltage inverter device comprising:

an abnormal voltage detection circuit detecting an abnormal voltage generated between terminals of the switching element during a period when the switching element is OFF; and a control circuit controlling a switching operation of the switching element and stopping the switching operation of the switching element by a signal that said abnormal voltage detection circuit has detected the abnormal voltage, wherein the signal that said abnormal voltage detection circuit has detected the abnormal voltage is transmitted to said control circuit by a photocoupler or a phototriac-coupler, and a light-emitting element thereof is provided on said abnormal voltage detection circuit side and a light-receiving element thereof is provided on said control circuit side, and wherein said abnormal voltage detection circuit is composed of a series circuit in which a diode, a varistor, and the light-emitting element of the photocoupler or the phototriac-coupler are connected in series.

5. The high voltage inverter device according to claim 4, wherein a parallel circuit composed of a resistor for current limitation and a capacitor is inserted in the series circuit.

6. The high voltage inverter device according to claim 4, wherein the resonant transformer is composed of a plurality of individual resonant transformers having same characteristics, excitation windings of the plurality of individual resonant transformers are connected in parallel or in series and simultaneously excited, output windings of the plurality of individual resonant transformers are connected in parallel or in series with each other, and time axes of output voltage waveforms of the output windings are in synchronization.

* * * * *